United States Patent [19]

Benson et al.

[11] Patent Number: 4,946,183
[45] Date of Patent: Aug. 7, 1990

[54] RETRACTABLE FIFTH WHEEL PULL HANDLE

[75] Inventors: W. D. Benson; Hollis L. Cahela; William N. Kirkland; Anthoney D. Pidgeon, all of Birmingham, Ala.

[73] Assignee: Fontaine Fifth Wheel Company, Birmingham, Ala.

[21] Appl. No.: 285,812

[22] Filed: Dec. 15, 1988

[51] Int. Cl.$^5$ ............................................. B62D 53/10
[52] U.S. Cl. ................................... 280/434; 280/433
[58] Field of Search ............... 280/433, 434, 435, 436

[56] References Cited

U.S. PATENT DOCUMENTS

| | | | |
|---|---|---|---|
| 2,934,358 | 4/1960 | Greenawalt | 280/434 |
| 3,063,738 | 11/1962 | Becker | 280/434 |
| 3,844,584 | 10/1974 | Fontaine | 280/434 |
| 4,140,328 | 2/1979 | Fontaine | 280/434 |

FOREIGN PATENT DOCUMENTS 2508255  9/1976  Fed. Rep. of Germany ...... 280/434

Primary Examiner—Charles A. Marmor
Assistant Examiner—Wook Yoon
Attorney, Agent, or Firm—Jennings, Carter, Thompson & Veal

[57] ABSTRACT

A pull handle for a fifth wheel utilizes a sliding connection to the operating handle of the locking jaw of the fifth wheel. A retractor spring biases the pull handle inwardly along the sliding connection such that the pull handle assumes a position which will not engage the tires of the tractor with the lock mechanism open, regardless of the adjustment of the suspension of the tractor.

7 Claims, 2 Drawing Sheets

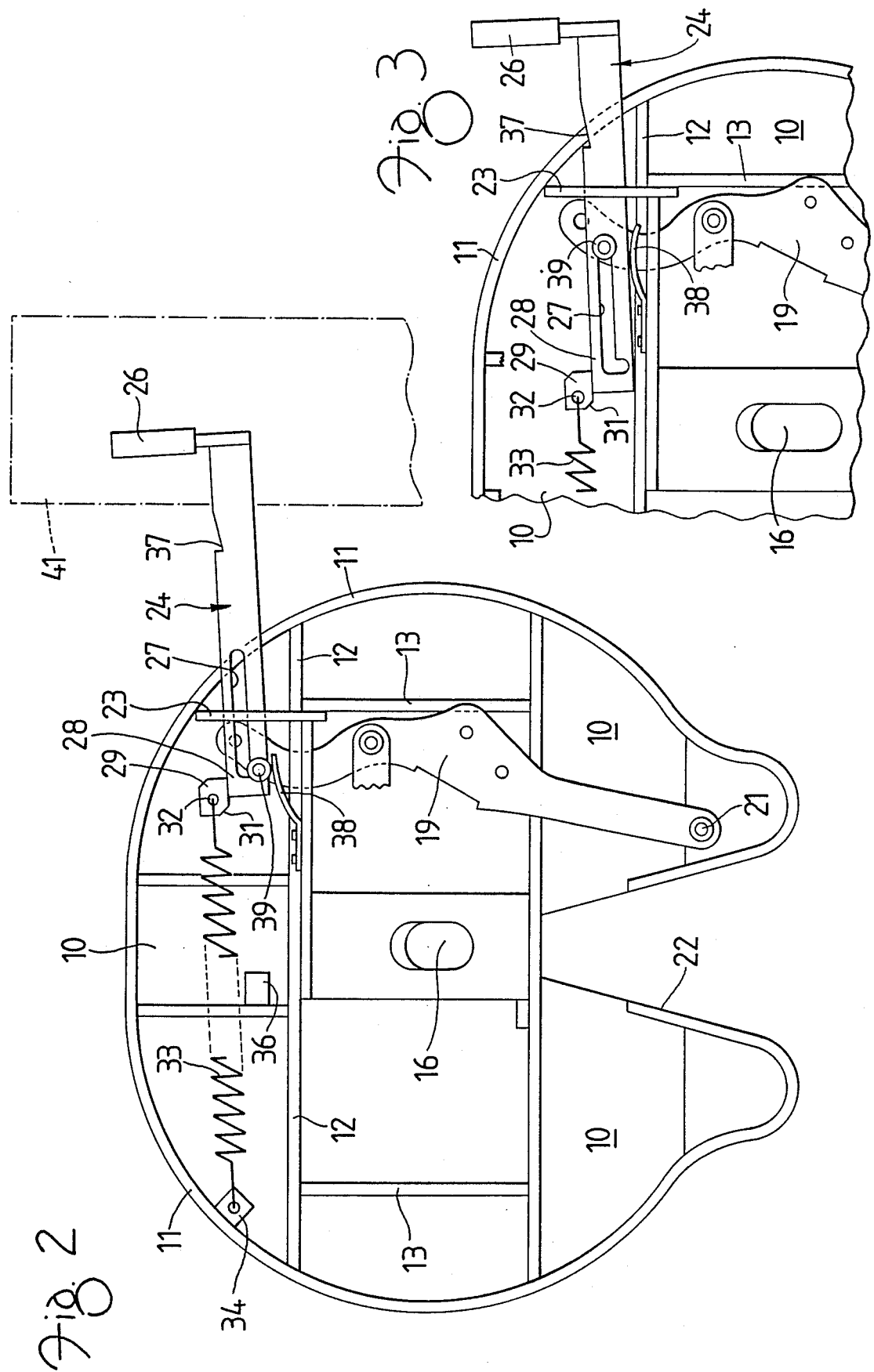

RETRACTABLE FIFTH WHEEL PULL HANDLE

FIELD OF THE INVENTION

This invention relates to fifth wheels for truck tractors and more particularly to an improvement to the manner in which such devices may be operated. Even more particularly the present invention relates to an improved pull handle for manual operation of such a device.

In the art to which this invention realtes it has been customary to hold the jaw of the fifth wheel in contact with the king pin by means of a wedge. The wedge was held in place between a part of the frame of the fifth wheel and the off king pin side of the jaw. An operating handle is provided to unlock the mechanism by first moving the wedge to a retracted position followed simultaneously by movement of the jaw permitting the king pin to be removed from or inserted into the fifth wheel. Typically the manual pull handle extends laterally of the fifth wheel adjacent the rear tires of the tractor. In current practice a number of tractors are equipped with an air-bag type suspension. If the pull handle has been used to open the fifth wheel jaws it extends above the tires. However, if the suspension is deflated thus lowering the suspension as when attempting to back the tractor into engagement with the trailer an interference condition can be created between the pull handle and the tires which can bend the pull handle leading to an unsafe or inoperable condition.

With the foregoing in mind it is the object of our invention to eliminate the potential for interference between the pull handle and the tires, thereby promoting the safety and operability of fifth wheels mounted on tractors having air bag type suspensions.

To accomplish this object and thereby improve the fifth wheels to which it applies, we utilize a pull handle which is biased toward the interior of the fifth wheel and is slidably connected to the operating handle such that the pull handle is urged to a non-tire engaging position within the frame of the tractor even when the operating handle is in the open position. More particularly we provide a generally flat elongated pull handle which has an outer end adapted to be manually grasped on an inner end disposed adjacent the operating handle of the fifth wheel. A pin on the operating handle is engaged within a slot in the pull handle proximal the inner end thereof and the pull handle is biased toward a fully retracted position.

BRIEF DESCRIPTION OF THE DRAWINGS

Apparatus embodying features of our invention are depicted in the accompanying drawings which form a portion of this disclosure and wherein:

FIG. 2 is a bottim view of the fifth wheel of FIG. 1 with certain parts omitted for clarity showing our pull handle fully extended; and FIG. 3 is a partial bottom view showing the pull handle in a partially retracted position.

DESCRIPTION OF A PREFERRED EMBODIMENT

Figure 1:
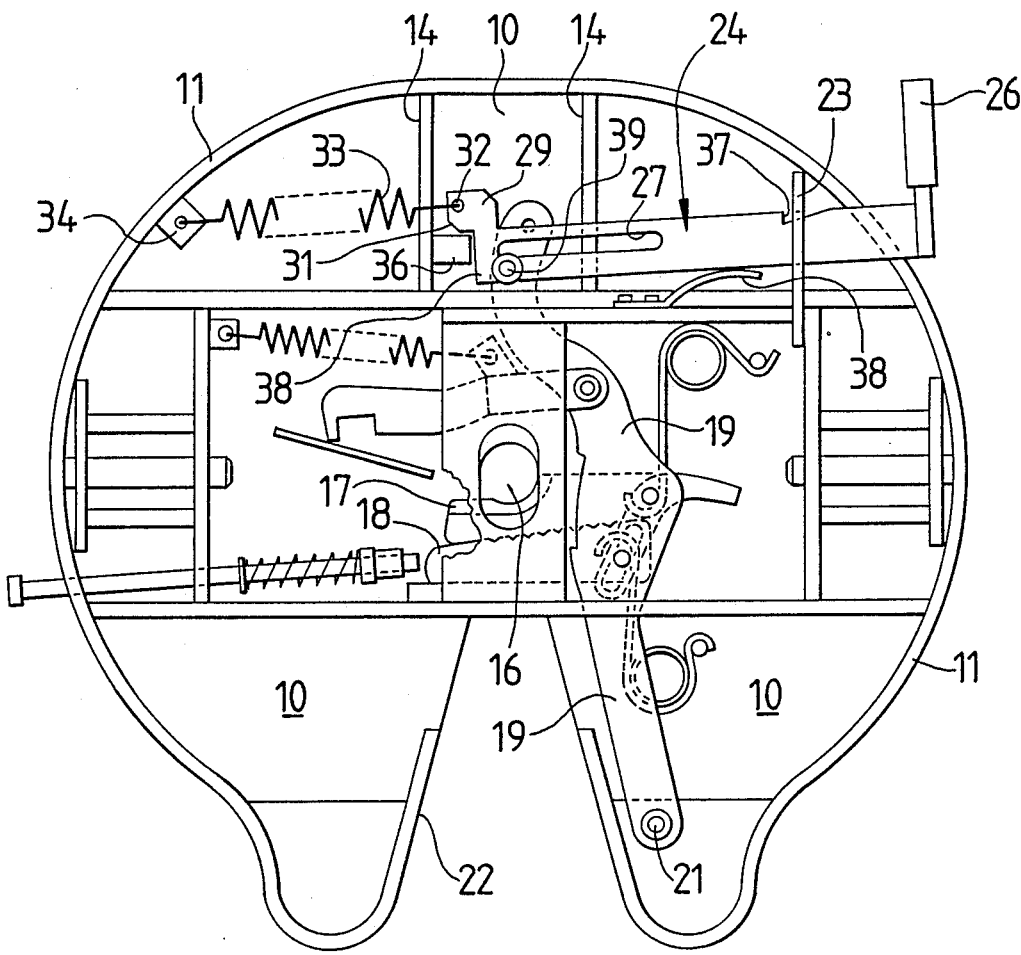
FIG. 1 is a bottom view of a typical fifth wheel showing our invention applied thereto.

Referring to the drawings for a better understanding of the invention it will be appreciated that the fifth wheel depicted therein is of typical construction such as has been heretofore described in various patents including U.S. Pat. No. 4,140,328, and 3,844,584 among others. The fifth wheel comprises a top plate 10 from which depends a peripheral flange 11. Various frame members such as shown at 12, 13, and 14 are secured to the undersurface of the plate 10 to form the structure of the fifth wheel.

A king pin carried by a vehicle such as a trailer to be towed is received in the region 16, and held in place by means of a jaw member 17 which is held in its locked position by a sliding wedge 18. An operating handle 19 is provided which pivots at 21 and which is adjusted to unlock the mechanism, such that movement of the handle 19 to the right causes movement of the wedge 18 to the right followed by movement of the locking jaw 17 to the right. Thus the mechanism is unlocked and the king pin may be inserted or withdrawn through the guide-like opening of the fifth wheel depicted at 22, all as is understood in the art.

Our invention resides in the novel pull handle which we have provided in combination with the fifth wheel. Affixed to the peripheral flange 11 and the frame member 12 or 13 is a handle guide 23 through which our pull handle 24 extends. The pull handle 24 has a grip 26 formed on its outer end so that it may be readily grasped to move the pull handle 24. The pull handle 24 is generally flat and has a slot 27 extending therethrough near the inner end 28. The slot 27 extends longitudinally of the pull handle 24 and has a laterally extending portion found at the innermost end thereof. Integral with the pull handle 24 and formed on the inner end 28 is an offset portion 29 which has a cam surface 31 formed thereon, at about 45° to the longitudinal axis of the pull handle 24. Attached to an eye 32 found in the offset portion 29 is a retractor spring 33 which is attached at its other end to a spring mount 34 affixed to the inner surface of the peripheral flange 11 such that the pull handle 24 is urged inwardly relative to the handle guide 24. A cam block 36 depends from the frame member 14 such that it is engaged by cam surface 31 when the retractor spring urges the pull handle 24 to the fully retracted position. A notch 37 in the pull handle 24 is positioned to engage the handle guide 24 when the pull handle is fully retracted and urged laterally by a leaf spring 38 mounted to frame member 12.

The slot 27 receives therethrough a shoulder bolt 39 which is affixed to the operating handle 19 of the fifth wheel. With the various parts thus identified the operation of our invention is readily understood.

Referring to FIG. 1, the mechanism is shown in the closed and locked position. The operating handle 19 must move to the right from the position shown to release the primary lock. In FIG. 1 the retractor spring 33 has urged the pull handle 24 against cam block 36 such that the inner end 28 is urged toward the front of the fifth wheel thereby forcing the shoulder bolt 39 into the laterally extending portion of the slot 27. Meanwhile spring pressure applied by leaf spring 38 urges the outer end of the pull handle 24 forwardly causing the notch 37 to engage the handle guide 23, effectively locking the pull handle 24 and the primary lock mechanism.

In FIG. 2 the pull handle 24 has been uerged rearwardly, releasing the notch 27 from the handle guide and pulled outwardly over the tires 41 of the tractor (shown in dotted line), moving the operating handle 19 to an open position and opening the fifth wheel lock mechanism. Note that this extended position is the position at which the prior art pull handles remain while the lock mechanism is open.

In FIG. 3, the pull handle 24 has been released, with the operating handle 19 in its open position. The retractor spring 33 urges the pull handle 24 to the left causing the pull handle 24 and slot 27 to move inwardly relative to the handle guide 27 and shoulder bolt 39. Inward movement of the pull handle 24 is arrested when the outer end of slot 27 abuts shoulder pin 39. The retractor spring 33 does not have enough power to move the operating handle 19 to its closed position, thus the lock mechanism remains open. The notch 27 remains outside the peripheral flange 11 of the fifth wheel in its position, thus providing a visual indication that the fifth wheel is ready to receive a king pin. Note that the retraction of the pull handle 24 eliminates any possible intereference between the pull handle 24 and the tires 41, thus the tractor suspension may be adjusted as desired and the tractor driven with the king pin lock mechanism open without worry or concern of damage to the equipment.

While we have shown our invention in one form, it will be obvious to those skilled in the art that it is not so limited but is susceptible of various changes and modifications without departing from the spiring thereof.

What I claim is:

1. In a fifth wheel, for connecting a tractor to a trailer, having a movable locking jaw for securing a king pin within said fifth wheel and an operating handle for moving said jaw to an open position, the improvement comprising:
   (a) a handle member cooperatively attached to said operating handle and displaceable laterally to an open position;
   (b) means for reducing the lateral extension of said handle member subsequent to displacement thereof to an open position including a spring attached to said handle member and resiliently biasing said handle toward a retracted position and means for slidably attaching said handle member to said operating handle including an elongated L-shaped slot formed in said handle member proximal said operating handle and a shoulder bolt engaged within said slot for rigidly affixed to said operating handle.

2. An apparatus for moving the operating handle of a fifth wheel comprising:
   (a) an elongated, generally flat rectangular handle member having an inner and outer end with an offset portion at said inner end, a pull handle at said outer end and a notch formed in a first side thereof, said handle member being movable to a retracted position and an extended position;
   (b) a handle guide attached to said fifth wheel and encircling said handle member intermediate said inner and outer end, with said handle guide adapted for selective partial insertion within said notch;
   (c) means affixed to said offset portion for biasing said handle member inwardly relative to said handle guide; and
   (d) means proximal said inner end for slidably connecting said handle member to an operating handle of said fifth wheel, said operating handle being selectively movable to an open and closed position, such that said biasing means urges said handle member toward a retracted position when said operating handle is in an open position.

3. Apparatus as defined in claim 2 wherein said means for slidably connecting comprises:
   (a) an elongated slot formed in said handle member proximal said inner end, said slot having an inner end outer end and a lateral extension at said inner end; and
   (b) a shoulder bolt affixed to said operating handle and slidably extending through said slot, said shoulder bolt being movable along said slot and within said lateral extension thereof.

4. Apparatus as defined in claim 3 wherein said biasing means comprises:
   (a) an extension spring affixed to said fifth wheel at one end thereof and to said offset portion at another end thereof.

5. Apparatus as defined in claim 4 further comprising a cam block engagable by said handle member at a cam surface formed on said offset portion thereof when said handle is initially unextended and a biasing member disposed adjacent said handle member to urge said outer end such that said handle member pivots about said pin.

6. The combination with a fifth wheel of the kind having a frame embodying a top plate, there being a depending peripheral flange carried by the frame, intermediate frame members beneath the top plate and depending from the same, together with a king pin jaw, a wedge for locking the jaw in a king pin retaining position and an operating handle for opening and closing said king pin jaw disposed within the frame and selectively movable to an open and closed position the combination further comprising:
   (a) a handle guide mounted beneath said peripheral flange and affixed thereto;
   (b) a handle member disposed within said handle guide and having an inner and outer end with said outer end adopted for manual grasping and extending beyond said peripheral flange;
   (c) means for biasing said handle member inwardly toward a retracted position relative to said when said operating handle is in an open position; and
   (d) means for slidably connecting said handle member to said operating handle such that said biasing means urges said handle member into a semi-semi-retracted position when said operating handle is in an open position including an elongated L-shaped slot formed in said handle member proximal said operating handle and a shoulder bolt engaged within said slot and rigidly affixed to said operating handle.

7. The combination as defined in claim 6 wherein said biasing means comprises:
   (a) an extension spring affixed to said fifth wheel at one end thereof and to an offset portion at another end thereof.

* * * * *